US010003779B2

(12) United States Patent
Ioka

(10) Patent No.: US 10,003,779 B2
(45) Date of Patent: Jun. 19, 2018

(54) MULTI-AREA WHITE-BALANCE CONTROL DEVICE, MULTI-AREA WHITE-BALANCE CONTROL METHOD, MULTI-AREA WHITE-BALANCE CONTROL PROGRAM, COMPUTER IN WHICH MULTI-AREA WHITE-BALANCE CONTROL PROGRAM IS RECORDED, MULTI-AREA WHITE-BALANCE IMAGE-PROCESSING DEVICE, MULTI-AREA WHITE-BALANCE IMAGE-PROCESSING METHOD, MULTI-AREA WHITE-BALANCE IMAGE-PROCESSING PROGRAM, COMPUTER IN WHICH MULTI-AREA WHITE-BALANCE IMAGE-PROCESSING PROGRAM IS RECORDED, AND IMAGE-CAPTURE APPARATUS

(71) Applicant: OLYMPUS CORPORATION, Hachioji-shi, Tokyo (JP)

(72) Inventor: Ken Ioka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

(21) Appl. No.: 15/268,596

(22) Filed: Sep. 18, 2016

(65) Prior Publication Data
US 2017/0006272 A1 Jan. 5, 2017

Related U.S. Application Data

(63) Continuation of application No. PCT/JP2014/078619, filed on Oct. 28, 2014.

(30) Foreign Application Priority Data

Mar. 19, 2014 (JP) .................................. 2014-056783

(51) Int. Cl.
H04N 9/73 (2006.01)
H04N 1/60 (2006.01)
(Continued)

(52) U.S. Cl.
CPC ........... *H04N 9/735* (2013.01); *H04N 1/6027* (2013.01); *H04N 1/6077* (2013.01); *H04N 9/07* (2013.01);
(Continued)

(58) Field of Classification Search
CPC ............. G09G 2320/0666; H04N 1/60; H04N 1/6027; H04N 1/6077; H04N 9/73; H04N 9/735; H04N 9/3182
(Continued)

(56) References Cited

U.S. PATENT DOCUMENTS 8,243,163 B2 * 8/2012 Chang .................... H04N 9/735
348/223.1
8,520,091 B2 * 8/2013 Fujiwara ................ H04N 9/735
348/222.1
(Continued)

FOREIGN PATENT DOCUMENTS

JP 2009004966 A 1/2009
JP 2009038712 A 2/2009
(Continued)

OTHER PUBLICATIONS

International Search Report (ISR) and Written Opinion dated Jan. 13, 2015 issued in International Application No. PCT/JP2014/078619.

*Primary Examiner* — Ngoc-Yen Vu
(74) *Attorney, Agent, or Firm* — Holtz, Holtz & Volek PC

(57) ABSTRACT

A multi-area white-balance control device includes a device that divides an inputted image into a plurality of areas, a device that estimates a white-balance correction gain for (Continued)

each of the divided areas, a device that determines whether the estimated white-balance correction gain of the area is peculiar or not, based on comparison with estimated white-balance correction gains of adjacent areas of the area and a device that modifies an estimated white-balance correction gain of an area determined to be peculiar, based on estimated white-balance correction gains of adjacent areas; and realizes color reproduction without unnaturalness even if white-balance correction gain estimation is wrong in an individual area.

19 Claims, 12 Drawing Sheets

(51) Int. Cl.
  *H04N 9/07* (2006.01)
  *H04N 1/46* (2006.01)
  *H04N 9/31* (2006.01)
(52) U.S. Cl.
  CPC ....... *H04N 9/73* (2013.01); *G09G 2320/0666* (2013.01); *H04N 9/3182* (2013.01)

(58) Field of Classification Search
  USPC ........................................ 348/223.1; 358/516
  See application file for complete search history.

(56) References Cited

U.S. PATENT DOCUMENTS

| | | | |
|---|---|---|---|
| 8,717,459 B2* | 5/2014 | Zhang | H04N 9/73 348/223.1 |
| 8,830,348 B2 | 9/2014 | Nomura | |
| 9,161,001 B2* | 10/2015 | Chino | H04N 9/735 |
| 9,723,285 B2* | 8/2017 | Yoshizaki | H04N 9/735 |
| 2009/0033762 A1 | 2/2009 | Abe | |
| 2010/0231746 A1 | 9/2010 | Nomura | |
| 2017/0094241 A1* | 3/2017 | Fujiwara | H04N 9/73 |
| 2017/0142387 A1* | 5/2017 | Saito | H04N 9/735 |

FOREIGN PATENT DOCUMENTS

| | | | | |
|---|---|---|---|---|
| JP | 2010213213 A | | 9/2010 | |
| JP | 2010213232 A | | 9/2010 | |
| JP | 2010-273319 A | * | 12/2010 | ............. H04N 9/73 |
| JP | 2013034261 A | | 2/2013 | |
| JP | 2015095681 A | | 5/2015 | |
| JP | 2015106737 A | | 6/2015 | |

* cited by examiner

FIG.4A

R/G WB CORRECTION GAIN MAP

|   | 0 | 1 | 2 | 3 | 4 | 5 | 6 |
|---|---|---|---|---|---|---|---|
| 0 | 1.1 | 1.1 | 1.1 | 1.1 | 1.1 | 1.1 | 1.1 |
| 1 | 1.1 | 1.1 | 1.1 | 1.1 | 1.1 | 0.7 | 1.1 |
| 2 | 1.1 | 1.1 | 1.1 | 1.1 | 1.1 | 1.1 | 1.1 |
| 3 | 1.1 | 1.1 | 1.1 | 0.8 | 0.8 | 1.1 | 1.1 |
| 4 | 1.1 | 1.1 | 1.1 | 1.1 | 1.1 | 1.1 | 1.1 |
| 5 | 1.1 | 1.1 | 1.1 | 1.1 | 1.1 | 1.1 | 1.1 |
| 6 | 1.1 | 1.1 | 1.1 | 1.1 | 1.1 | 1.1 | 1.1 |

FIG.4B

B/G WB CORRECTION GAIN MAP

|   | 0 | 1 | 2 | 3 | 4 | 5 | 6 |
|---|---|---|---|---|---|---|---|
| 0 | 1.2 | 1.2 | 1.2 | 1.2 | 1.2 | 1.2 | 1.2 |
| 1 | 1.2 | 1.2 | 1.2 | 1.2 | 1.2 | 0.8 | 1.2 |
| 2 | 1.2 | 1.2 | 1.2 | 1.2 | 1.2 | 1.2 | 1.2 |
| 3 | 1.2 | 1.2 | 1.2 | 1 | 1 | 1.2 | 1.2 |
| 4 | 1.2 | 1.2 | 1.2 | 1.2 | 1.2 | 1.2 | 1.2 |
| 5 | 1.2 | 1.2 | 1.2 | 1.2 | 1.2 | 1.2 | 1.2 |
| 6 | 1.2 | 1.2 | 1.2 | 1.2 | 1.2 | 1.2 | 1.2 |

FIG.5A
MODIFIED R/G WB CORRECTION GAIN MAP

|   | 0   | 1   | 2   | 3   | 4   | 5   | 6   |
|---|-----|-----|-----|-----|-----|-----|-----|
| 0 | 1.1 | 1.1 | 1.1 | 1.1 | 1.1 | 1.1 | 1.1 |
| 1 | 1.1 | 1.1 | 1.1 | 1.1 | 1.1 | 1.1 | 1.1 |
| 2 | 1.1 | 1.1 | 1.1 | 1.1 | 1.1 | 1.1 | 1.1 |
| 3 | 1.1 | 1.1 | 1.1 | 0.8 | 0.8 | 1.1 | 1.1 |
| 4 | 1.1 | 1.1 | 1.1 | 1.1 | 1.1 | 1.1 | 1.1 |
| 5 | 1.1 | 1.1 | 1.1 | 1.1 | 1.1 | 1.1 | 1.1 |
| 6 | 1.1 | 1.1 | 1.1 | 1.1 | 1.1 | 1.1 | 1.1 |

FIG.5B
MODIFIED B/G WB CORRECTION GAIN MAP

|   | 0   | 1   | 2   | 3   | 4   | 5   | 6   |
|---|-----|-----|-----|-----|-----|-----|-----|
| 0 | 1.2 | 1.2 | 1.2 | 1.2 | 1.2 | 1.2 | 1.2 |
| 1 | 1.2 | 1.2 | 1.2 | 1.2 | 1.2 | 1.2 | 1.2 |
| 2 | 1.2 | 1.2 | 1.2 | 1.2 | 1.2 | 1.2 | 1.2 |
| 3 | 1.2 | 1.2 | 1.2 | 1   | 1   | 1.2 | 1.2 |
| 4 | 1.2 | 1.2 | 1.2 | 1.2 | 1.2 | 1.2 | 1.2 |
| 5 | 1.2 | 1.2 | 1.2 | 1.2 | 1.2 | 1.2 | 1.2 |
| 6 | 1.2 | 1.2 | 1.2 | 1.2 | 1.2 | 1.2 | 1.2 |

DIVISION AREA

| rg[i-1,j-1] bg[i-1,j-1] | rg[i,j-1] bg[i,j-1] | rg[i+1,j-1] bg[i+1,j-1] |
|---|---|---|
| rg[i-1,j] bg[i-1,j] | rg[i,j] bg[i,j] | rg[i+1,j] bg[i+1,j] |
| rg[i-1,j+1] bg[i-1,j+1] | rg[i,j+1] bg[i,j+1] | rg[i+1,j+1] bg[i+1,j+1] |

EUCLIDEAN DISTANCE OF
WB CORRECTION GAIN
BETWEEN AREA OF ATTENTION
AND AREA JUST ABOVE IT

FIG.8A

| 1.1 | 1.1 | 1.1 | 1.1 |
|     |     | 0.7 | 1.1 |
| 1.1 | 1.1 | 1.1 | 1.1 |
|     | 0.7 | 0.7 |     |
| 1.1 | 1.1 | 1.1 | 1.1 |
| 1.1 | 1.1 |     |     |

FIG.8B

| 1.1 | 1.1 | 1.1 | 1.1 |
|     |     | 1.1 | 1.1 |
| 1.1 | 1.1 | 1.1 | 1.1 |
|     | 0.7 | 0.7 |     |
| 1.1 | 1.1 | 1.1 | 1.1 |
| 1.1 | 1.1 |     |     |

FIG.11A
SMOOTHING-PROCESSED R/G WB CORRECTION GAIN MAP

|   | 0 | 1 | 2 | 3 | 4 | 5 | 6 |
|---|---|---|---|---|---|---|---|
| 0 | 1.1 | 1.1 | 1.1 | 1.1 | 1.1 | 1.1 | 1.1 |
| 1 | 1.1 | 1.1 | 1.1 | 1.1 | 1.1 | 1.1 | 1.1 |
| 2 | 1.1 | 1.1 | 1.07 | 1.03 | 1.03 | 1.07 | 1.1 |
| 3 | 1.1 | 1.1 | 1.07 | 1.03 | 1.03 | 1.07 | 1.1 |
| 4 | 1.1 | 1.1 | 1.07 | 1.03 | 1.03 | 1.07 | 1.1 |
| 5 | 1.1 | 1.1 | 1.1 | 1.1 | 1.1 | 1.1 | 1.1 |
| 6 | 1.1 | 1.1 | 1.1 | 1.1 | 1.1 | 1.1 | 1.1 |

FIG.11B
SMOOTHING-PROCESSED B/G WB CORRECTION GAIN MAP

|   | 0 | 1 | 2 | 3 | 4 | 5 | 6 |
|---|---|---|---|---|---|---|---|
| 0 | 1.2 | 1.2 | 1.2 | 1.2 | 1.2 | 1.2 | 1.2 |
| 1 | 1.2 | 1.2 | 1.2 | 1.2 | 1.2 | 1.2 | 1.2 |
| 2 | 1.2 | 1.2 | 1.18 | 1.16 | 1.16 | 1.18 | 1.2 |
| 3 | 1.2 | 1.2 | 1.18 | 1.16 | 1.16 | 1.18 | 1.2 |
| 4 | 1.2 | 1.2 | 1.18 | 1.16 | 1.16 | 1.18 | 1.2 |
| 5 | 1.2 | 1.2 | 1.2 | 1.2 | 1.2 | 1.2 | 1.2 |
| 6 | 1.2 | 1.2 | 1.2 | 1.2 | 1.2 | 1.2 | 1.2 |

FIG.12A
SMOOTHING-PROCESSED R/G WB CORRECTION GAIN MAP

|   | 0 | 1 | 2 | 3 | 4 | 5 | 6 |
|---|---|---|---|---|---|---|---|
| 0 | 1.1 | 1.1 | 1.1 | 1.1 | 1.03 | 1.03 | 1 |
| 1 | 1.1 | 1.1 | 1.1 | 1.1 | 1.06 | 1.06 | 1.03 |
| 2 | 1.1 | 1.1 | 1.07 | 1.03 | 0.98 | 1.02 | 1.03 |
| 3 | 1.1 | 1.1 | 1.07 | 1.03 | 1.03 | 1.07 | 1.1 |
| 4 | 1.1 | 1.1 | 1.07 | 1.03 | 1.03 | 1.07 | 1.1 |
| 5 | 1.1 | 1.1 | 1.1 | 1.1 | 1.1 | 1.1 | 1.1 |
| 6 | 1.1 | 1.1 | 1.1 | 1.1 | 1.1 | 1.1 | 1.1 |

FIG.12B
SMOOTHING-PROCESSED B/G WB CORRECTION GAIN MAP

|   | 0 | 1 | 2 | 3 | 4 | 5 | 6 |
|---|---|---|---|---|---|---|---|
| 0 | 1.2 | 1.2 | 1.2 | 1.2 | 1.13 | 1.13 | 1.1 |
| 1 | 1.2 | 1.2 | 1.2 | 1.2 | 1.16 | 1.16 | 1.13 |
| 2 | 1.2 | 1.2 | 1.18 | 1.16 | 1.11 | 1.13 | 1.13 |
| 3 | 1.2 | 1.2 | 1.18 | 1.16 | 1.16 | 1.18 | 1.2 |
| 4 | 1.2 | 1.2 | 1.18 | 1.16 | 1.16 | 1.18 | 1.2 |
| 5 | 1.2 | 1.2 | 1.2 | 1.2 | 1.2 | 1.2 | 1.2 |
| 6 | 1.2 | 1.2 | 1.2 | 1.2 | 1.2 | 1.2 | 1.2 |

MULTI-AREA WHITE-BALANCE CONTROL DEVICE, MULTI-AREA WHITE-BALANCE CONTROL METHOD, MULTI-AREA WHITE-BALANCE CONTROL PROGRAM, COMPUTER IN WHICH MULTI-AREA WHITE-BALANCE CONTROL PROGRAM IS RECORDED, MULTI-AREA WHITE-BALANCE IMAGE-PROCESSING DEVICE, MULTI-AREA WHITE-BALANCE IMAGE-PROCESSING METHOD, MULTI-AREA WHITE-BALANCE IMAGE-PROCESSING PROGRAM, COMPUTER IN WHICH MULTI-AREA WHITE-BALANCE IMAGE-PROCESSING PROGRAM IS RECORDED, AND IMAGE-CAPTURE APPARATUS

This application is a continuation of PCT International Application No. PCT/JP2014/078619, filed on Oct. 28, 2014 and claims the benefit of Japanese Patent Application No. 2014-056783 filed in Japan on Mar. 19, 2014. The contents of PCT International Application No. PCT/JP2014/078619 and Japanese Patent Application No. 2014-056783 are incorporated herein by reference.

BACKGROUND OF THE INVENTION

1) Field of the Invention

The present invention relates to a multi-area white-balance image-processing device, a multi-area white-balance image-processing method, a multi-area white-balance image-processing program, a computer in which the multi-area white-balance image-processing program is recorded, and an image-capture apparatus provided with the multi-area white-balance image-processing device for, in multi-area white-balance image processing of an image obtained by photographing a scene illuminated by a plurality of lighting sources, realizing color reproduction without unnaturalness in the entire image by estimating, for the image divided into a plurality of areas, a white-balance correction gain for each of the areas, and performing white-balance correction of the entire inputted image using the estimated white-balance correction gains of all the areas.

2) Description of Related Art

A photographic lighting source changes its color temperature depending on solar altitude, atmosphere conditions etc., for example, in the daytime outdoors. In addition, the color temperature differs depending on whether the place is sunny or shady.

Furthermore, regarding indoor photography, there are various types of artificial lighting such as by a fluorescent lamp, an incandescent lamp, etc. which are different in color temperature.

Further, when flash is used in photographing outdoors in the daytime, mixture of the flash light and the natural light forms a photographic lighting source.

Further, when flash is used in photographing outdoors in the nighttime, the flashlight and the background artificial light are not mixed, but the color temperature of lighting source differs among different areas in the same scene.

Further, when flash is used in photographing indoors, the flash light and the artificial light are mixed to form a photographic lighting source.

Under the various photographic lighting sources as stated above, color adaptation occurs in human eyes. That is, human eyes sense a white object in an area of attention white irrespective of whether the lighting source is sunlight, artificial light, or mixed light of these. In accordance with this characteristic of human eyes, a camera, which is an input device, is configured to control RGB gains to set so-called white-balance.

However, since a camera does not know a photographic lighting source before photographing, the kind of photographic illumination (color temperature of the lighting source) is generally assumed from a photographed image or specified by a user so that white balance of the entire photographed image is corrected according to the type of illumination.

In most of conventional digital cameras, a white-balance correction gain is determined on the assumption that there is one kind of lighting source at the time of photographing, and white balance of a photographed image is corrected with the use of the white-balance correction gain.

However, in a case where a scene of an object is illuminated by a plurality of lighting sources, it is necessary to divide an acquired image into a plurality of areas and perform different white-balance processing for each of the divided areas in order to highly accurately perform white-balancing over the entire image.

As a conventional method for performing white-balance processing of an image captured by photographing a scene illuminated by a plurality of lighting sources, for example, Japanese Patent Laid-Open No. 2010-213232 discloses: for the purpose of solving the problem that, when there are a plurality of illumination areas by different kinds of lighting sources in one frame for image capture, it is difficult to achieve appropriate white balance over the entire frame for image capture, and thus a color shift is generated in a captured image, dividing the frame for image capture into a plurality of regions in accordance with brightness information and color information; setting a different white-balance correction coefficient for each of the plurality of regions; setting a white-balance correction coefficient limit for causing differences among the white-balance correction coefficients set for the individual plurality of regions to be included within a predetermined range, and generating a white-balance correction coefficient for the entire frame for image capture.

SUMMARY OF THE INVENTION

A multi-area white-balance control device according to embodiments of the present invention includes: area dividing means that divides an inputted image into a plurality of areas; white-balance correction gain estimating means that estimates a white-balance correction gain for each of the areas divided by the area dividing means; white-balance correction gain peculiarity determining means that determines whether the estimated white-balance correction gain of the area is peculiar or not, based on comparison with white-balance correction gains of surrounding areas adjoining the area estimated by the white-balance correction gain estimating means; and white-balance correction gain modifying means that modifies an estimated white-balance correction gain of an area determined to be peculiar by the white-balance correction gain peculiarity determining, based on estimated white-balance correction gains of surrounding areas adjoining the area determined to be peculiar; and a white-balance correction gain map of the entirety of the inputted image in which the estimated white-balance correction gain of the area determined to be peculiar, among estimated white-balance correction gains of all the areas, is modified is generated.

Further, a multi-area white-balance control method according to the embodiments of the present invention includes: dividing an inputted image into a plurality of areas; estimating a white-balance correction gain for each of the divided areas; determining whether the estimated white-balance correction gain of the area is peculiar or not, based on comparison with estimated white-balance correction gains of surrounding areas adjoining the area; and generating a white-balance correction gain map of the entirety of the inputted image in which the estimated white-balance correction gain of the area determined to be peculiar, among estimated white-balance correction gains of all the areas, is modified, by modifying an estimated white-balance correction gain of an area determined to be peculiar, based on estimated white-balance correction gains of surrounding areas adjoining the area determined to be peculiar.

Further, in a computer in which a multi-area white-balance control program according to the embodiments of the present invention is recorded, the multi-area white-balance control program is recorded which causes the computer to function as: area dividing means that divides an inputted image into a plurality of areas; white-balance correction gain estimating means that estimates a white-balance correction gain for each of the areas divided by the area dividing means; white-balance correction gain peculiarity determining means that determines whether the estimated white-balance correction gain of the area is peculiar or not, based on comparison with white-balance correction gains of surrounding areas adjoining the area estimated by the white-balance correction gain estimating means; and white-balance correction gain modifying means that modifies an estimated white-balance correction gain of an area determined to be peculiar by the white-balance correction gain peculiarity determining means, based on estimated white-balance correction gains of surrounding areas adjoining the area determined to be peculiar; and the multi-area white-balance control program being for generating a white-balance correction gain map of the entirety of the inputted image in which the estimated white-balance correction gain of the area determined to be peculiar, among estimated white-balance correction gains of all the areas, has been modified.

Further, a multi-area white-balance control program according to the embodiments of the present invention is a multi-area white-balance control program readable by a computer provided in a multi-area white-balance control device, the multi-area white-balance control program causing the computer to function as: area dividing means that divides an inputted image into a plurality of areas; white-balance correction gain estimating means that estimates a white-balance correction gain for each of the areas divided by the area dividing means; white-balance correction gain peculiarity determining means that determines whether the estimated white-balance correction gain of the area is peculiar or not, based on comparison with white-balance correction gains of surrounding areas adjoining the area estimated by the white-balance correction gain estimating means; and white-balance correction gain modifying means that modifies an estimated white-balance correction gain of an area determined to be peculiar by the white-balance correction gain peculiarity determining means, based on estimated white-balance correction gains of surrounding areas adjoining the area determined to be peculiar; and the multi-area white-balance control program generating a white-balance correction gain map of the entirety of inputted image in which the estimated white-balance correction gain of the area determined to be peculiar, among estimated white-balance correction gains of all the areas, is modified.

According to the embodiments of the present invention, it is possible to obtain a multi-area white-balance control device, a multi-area white-balance control method, a multi-area white-balance control program, a computer in which the multi-area white-balance control program is recorded, a multi-area white-balance image-processing device, a multi-area white-balance image-processing method, a multi-area white-balance image-processing program, a computer in which the multi-area white-balance image-processing program is recorded, and an image capture apparatus provided with the multi-area white-balance image processing device, each of which is capable of, in the case of dividing an entire photographic image into a plurality of areas and estimating a white-balance correction gain of each of the areas, realizing color reproduction without unnaturalness even if white-balance correction gain estimation is wrong in an individual area.

This and other features and advantages of the present invention will become apparent from the following detailed description of the preferred embodiments when taken in conjunction with the accompanying drawings.

BRIEF DESCRIPTION OF THE DRAWINGS

FIGS. 4A and 4B are explanatory diagrams showing examples of white-balance correction gain maps corresponding to all the areas of the inputted image estimated by white-balance correction gain estimating means and white-balance correction gains determined to be peculiar by white-balance correction gain peculiarity determining means, in the multi-area white-balance control device of FIG. 1; FIG. 4A is a diagram showing an R/G white-balance correction gain map and white-balance correction gains determined to be peculiar by the white-balance correction gain peculiarity determining means; and FIG. 4B is a diagram showing a B/G white-balance correction gain map and white-balance correction gains determined to be peculiar by the white-balance correction gain peculiarity determining means;

FIGS. 5A and 5B are explanatory diagrams showing examples of a white-balance correction gain map corresponding to all the areas of the inputted image in which white-balance correction gain modifying means has modified estimated white-balance correction gains of areas determined to be peculiar by the white-balance correction gain peculiarity determining means, based on estimated white-balance correction gains of surrounding areas adjoining the areas determined to be peculiar, in the multi-area white-balance control device of FIG. 1; FIG. 5A is a diagram showing the modified R/G white-balance correction gain map; and FIG. 5B is a diagram showing the modified B/G white-balance correction gain map;

FIG. 7A is a diagram showing the estimated white-balance correction gains of the area of attention and each of the estimated white-balance correction gains of the surrounding areas adjoining the area of attention; and FIG. 7B is a diagram showing, as an example of a difference between the white-balance correction gains of the area of attention and white-balance correction gains of one area among the surrounding areas adjoining the area of attention, a distance between points indicating the white-balance correction gains of the area of attention and the one area among the surrounding areas adjoining the area of attention, when an R/G white-balance correction gain and a B/G white-balance correction gain of the area of attention are indicated by one coordinate axis and the other coordinate axis, respectively, on the XY coordinates.

FIGS. 8A and 8B are explanatory diagrams showing white-balance correction gain maps at the time when the area dividing means has divided the inputted image into a plurality of areas with a size different from the size of the example of FIG. 3 in the multi-area white-balance control device of FIG. 1 as a modification of the present embodiment; FIG. 8A is a diagram showing an R/G white-balance correction gain map and white-balance correction gains determined to be peculiar by the white-balance correction gain peculiarity determining means before modification; and FIG. 8B is a diagram showing an R/G white-balance correction gain map in which the estimated white-balance correction gains of areas determined to be peculiar are modified.

FIGS. 11A and 11B are explanatory diagrams showing examples of white-balance correction gain maps corresponding to all the areas of the inputted image which have been smoothing-processed by white-balance correction gain smoothing means, in the multi-area white-balance control device of FIG. 9; FIG. 11A is a diagram showing a smoothing-processed R/G white-balance correction gain map; and FIG. 11B is a diagram showing a smoothing-processed B/G white-balance correction gain map; and FIGS. 12A and 12B are explanatory diagrams showing examples of white-balance correction gain maps in a case where a smoothing process similar to that of FIGS. 11A and 11B has been performed for the estimated white-balance correction gain maps of the entire inputted image, without performing modification of an estimated white-balance correction gain of an area possibly determined to be peculiar, as a comparison example of FIGS. 11A and 11B; FIG. 12A is a diagram showing a smoothing-processed R/G white-balance correction gain map; and FIG. 12B is a diagram showing a smoothing-processed B/G white-balance correction gain map.

DETAILED DESCRIPTION OF THE PREFERRED EMBODIMENTS

Prior to description of embodiments, the operation and effects of the present invention will be described.

The present invention is configured to divide an inputted image into a plurality of areas; estimate a white-balance correction gain for each of the divided areas; determine whether the estimated white-balance correction gain of the area of attention is peculiar or not, based on comparison with estimated white-balance correction gains of surrounding areas adjoining the area of attention; and generate a white-balance correction gain map of the entire inputted image in which the estimated white-balance correction gain of the area determined to be peculiar, among estimated white-balance correction gains of all the areas, is modified, by modifying an estimated white-balance correction gain of an area determined to be peculiar, based on estimated white-balance correction gains of surrounding areas adjoining the area determined to be peculiar.

If it is determined based on comparison with the estimated white-balance correction gains of surrounding areas adjoining the area of attention whether the estimated white-balance correction gain of the area of attention is peculiar or not, and an estimated white-balance correction gain of an area determined to be peculiar is modified based on the estimated white-balance correction gains of the surrounding areas adjoining the area determined to be peculiar, as in the present invention, it is possible to, even if a white-balance correction gain initially estimated in an individual area is wrong, create a white-balance correction gain map in which values of white-balance correction gains of all the areas are appropriate, corresponding to the inputted image. When the white balance of the entire inputted image is corrected based on the white-balance correction gain map of the entire inputted image in which the white-balance correction gain of the area for which estimation was wrongly performed has been modified, color reproduction without unnaturalness can be realized in which an adverse effect does not occur in white-balance correction of the entire inputted image, and color balance of the area of attention in the entire inputted image is appropriately maintained.

Further, in the present invention, if the smoothing process is further performed for the white-balance correction gains of all the areas of the entire inputted image, including the area which has been determined to be peculiar and the estimated white-balance correction gain of which has been modified, it is possible to, for an image obtained by photographing a scene illuminated by a plurality of lighting sources, suppress discontinuity of brightness and color among areas.

Embodiments of the present invention will be described with reference to drawings. The embodiments below do not limit the present invention according to the claims.

First Embodiment

Figure 1:
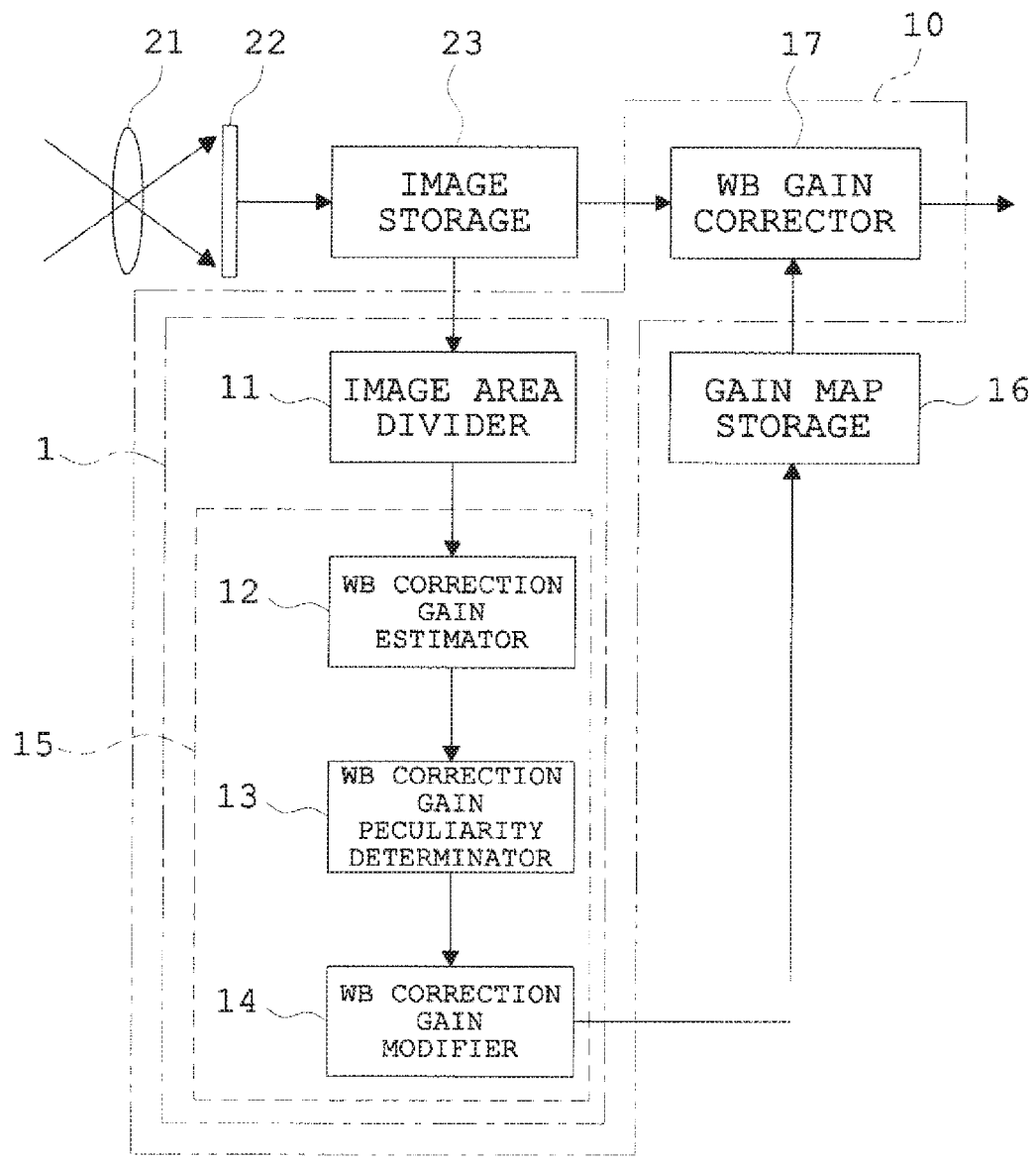
FIG. 1 is a block diagram of a digital camera provided with a multi-area white-balance control device according to a first embodiment of the present invention.
Figure 2:
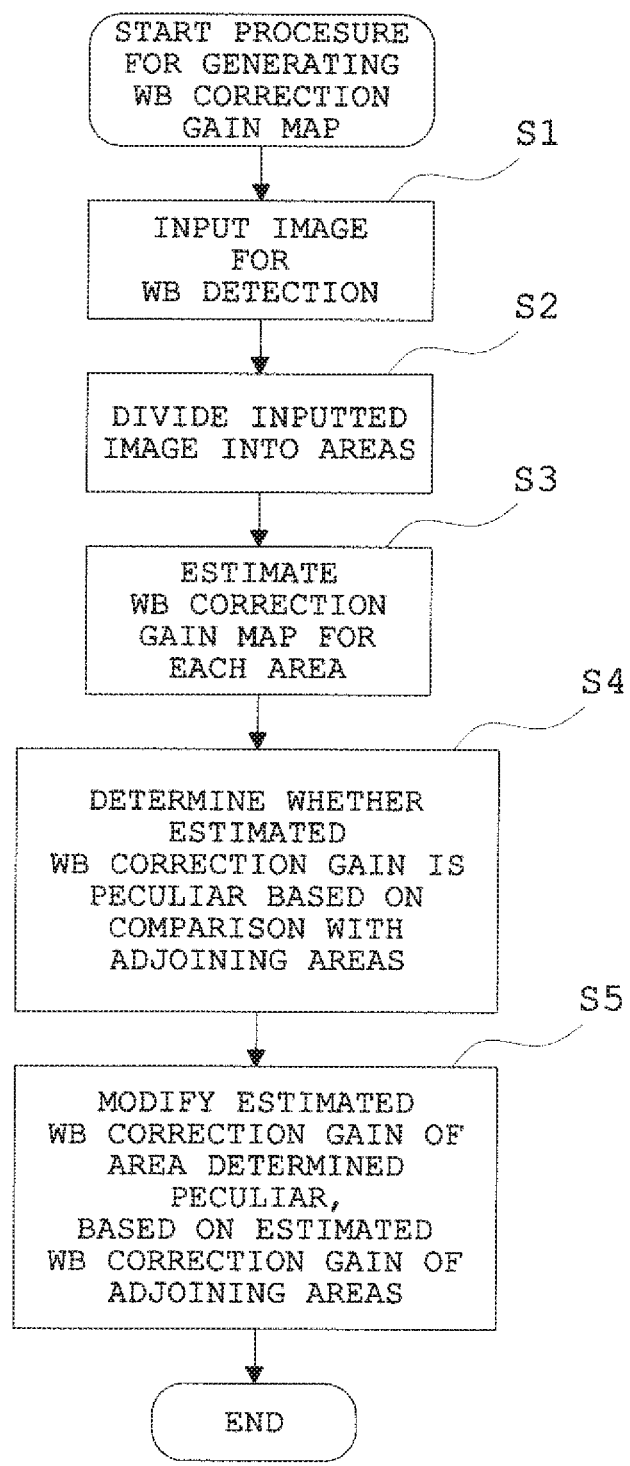
FIG. 2 is a flowchart showing a process procedure performed until, from an inputted image in the multi-area white-balance control device of FIG. 1, a white-balance correction gain map of the entire inputted image, in which an estimated white-balance correction gain of an area determined to be peculiar has been corrected, is generated.

FIG. 1 is a block diagram of a digital camera provided with a multi-area AWB (auto white-balance) control device according to a first embodiment of the present invention. In FIG. 1, a part surrounded by a one-dot chain line and a part surrounded by a two-dot chain line are configurations corresponding to the multi-area white-balance control device according to the present embodiment and the multi-area white-balance image-processing device according to the present embodiment, respectively. FIG. 2 is a flowchart showing a process procedure performed until, from an inputted image in the multi-area white-balance control device of FIG. 1, a white-balance correction gain map of the entire inputted image, in which an estimated white-balance correction gain of an area determined to be peculiar has been modified, is generated.

A multi-area white-balance control device 1 of the present embodiment has an image-area divider 11 as area dividing means, a WB (white-balance) correction gain estimator 12 as white-balance correction gain estimating, a WB (white-balance) correction gain peculiarity determiner 13 as white-balance correction gain peculiarity determining, and a WB (white-balance) correction gain modifier 14 as white-balance correction gain modifying means as shown in FIG. 1. In FIG. 1, reference numeral 10 denotes a multi-area white-balance image-processing device, reference numeral 15 denotes a WB (white-balance) correction gain map generator as white-balance correction gain map generating means, reference numeral 16 denotes a gain map storage which stores a white-balance correction gain map of an entire inputted image in which an estimated white-balance correction gain of an area determined to be peculiar has been modified by the WB (white-balance) correction gain modifier 14, reference numeral 17 denotes a WB (white-balance) gain corrector as white-balance processor, reference numeral 21 denotes a lens, reference numeral 22 denotes an image sensor, and reference numeral 23 denotes an image storage which stores an image captured by the image sensor 22. The digital camera provided with the multi-area white-balance image-processing device 10 of the present embodiment is provided with a control section not shown. The control section is provided with the function of storing an image captured by the image sensor 22 in accordance with a photographing instruction into the image storage 23 and the function of inputting an image stored in the image storage 23 independent of each other. In the example of FIG. 1, an image captured by the image sensor 22 via the lens 21 in accordance with a photographing instruction of the control section not shown is stored in the image storage 23 as a digital signal.

The image-area divider 11 divides an inputted image into a plurality of areas with a predetermined size.

The WB correction gain estimator 12 estimates white-balance correction gains R/G and B/G for each of the areas divided by the image-area divider 11.

Details of a method for estimating a white-balance correction gain will be described later.

The WB correction gain peculiarity determiner 13 determines whether the white-balance correction gains of each area of a white-balance correction gain map, which have been estimated by the WB correction gain estimator 12, are peculiar or not, based on comparison with estimated white-balance correction gains of surrounding areas adjoining the area of attention.

Details of a method for determining whether the white-balance correction gains are peculiar or not will be described later.

The WB correction gain modifier 14 modifies a white-balance correction gain of an area determined to be peculiar by the WB correction gain peculiarity determiner 13, based on white-balance correction gains of surrounding areas adjoining the area determined to be peculiar.

Details of a method for modifying the white-balance correction gain will be described later.

The WB gain corrector 17 corrects white balance of the entire inputted image based on the white-balance correction gain map in which the white-balance correction gain of the area of attention has been modified by the WB correction gain modifier 14. The white balance of the entire inputted image is corrected based on the white-balance correction gain map of the entire inputted image in which the estimated white-balance correction gain of the area determined to be peculiar by the WB correction gain peculiarity determiner 13, among white-balance correction gains of all the areas estimated by the WB correction gain estimator 12, has been modified by the WB correction gain modifier 14.

The flow of a process until, from an inputted image, a white-balance correction gain map of an entire inputted image, in which an estimated white-balance correction gain of an area determined to be peculiar has been modified, is generated, using the multi-area white-balance control device of the present embodiment configured as described above will be described with the use of FIG. 2 to FIGS. 5A and 5B.

First, the control section not shown of the digital camera inputs image data stored in the image storage 23 via an output of the image sensor 22 (step S1).

Figure 3:
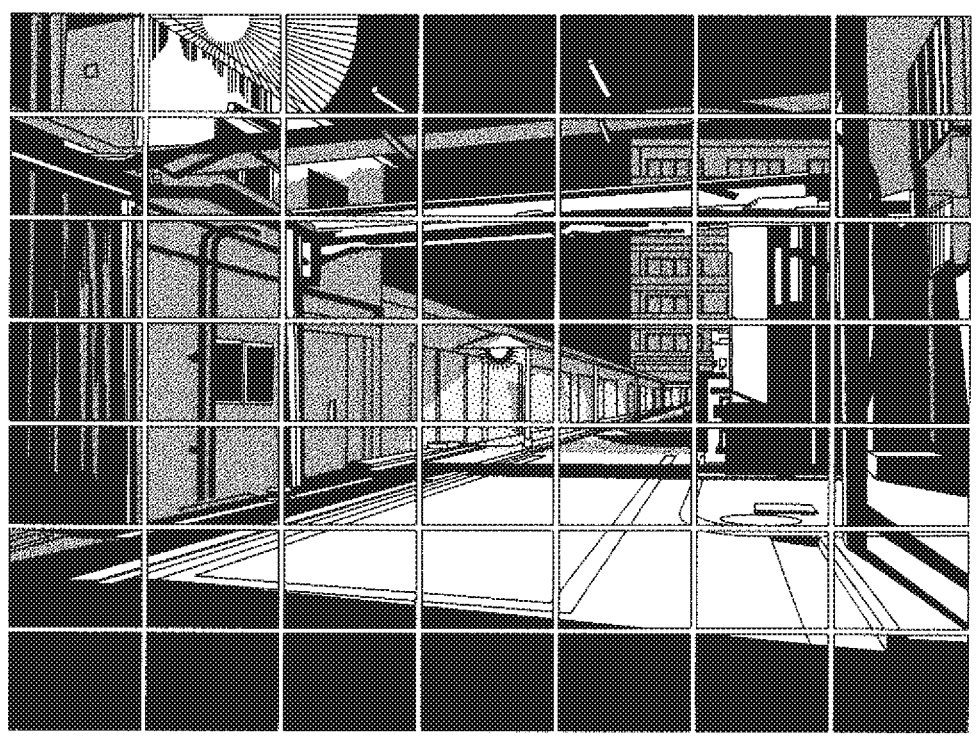
FIG. 3 is an explanatory diagram showing an example in which area dividing means has divided the inputted image into a plurality of areas in the multi-area white-balance control device of FIG. 1.

Next, the image-area divider 11 divides the inputted image data into a plurality of areas with a predetermined size (step S2). In the description below, the image data is divided into 7×7 areas, for example, as shown in FIG. 3 for convenience sake.

Next, the WB correction gain estimator 12 estimates an R/G white-balance correction gain and a B/G white-balance correction gain for an image of each of the areas divided by the image-area divider 11 using any of methods conventionally proposed, for example, the method described in Japanese Patent Laid-Open No. 2009-038712 or the like (step S3). This estimation is sequentially performed for all the areas and is repeated until estimation for all the areas ends.

As a result, a WB-correction gain map corresponding to all the areas of the inputted image is obtained, for example, as shown in FIGS. 4A and 4B as an output of the WB correction gain estimator 12.

In the method described in Japanese Patent Laid-Open No. 2009-038712, likelihood of a photographing scene belonging to a particular group with a similar illumination color is calculated based on a feature vector of the photographing scene and a determination criterion calculated in advance, and white-balance correction gains are acquired based on the calculated likelihood and an image photographed in the photographing scene. Further, as another method for the WB correction gain estimator 12 to estimate the R/G white-balance correction gain and the B/G white-balance correction gain, there is a method in which color temperature is acquired for each of a plurality areas obtained by dividing an inputted image, and white-balance correction gains are acquired based on the acquired color temperature of each area, which is described in Japanese Patent Laid-Open No. 2015-095681 proposed by the applicant of the present application and Japanese Patent Laid-Open No. 2015-106737.

Especially, when the method described in Japanese Patent Laid-Open No. 2009-038712 is used, white-balance correction gains of the image are accurately and directly calculated without identifying the kind of illumination used at the time of photographing.

Next, the WB correction gain peculiarity determiner 13 determines whether white-balance correction gains of each area of the white-balance correction gain map, which have been estimated by the WB correction gain estimator 12, are peculiar or not, based on comparison between the estimated white-balance correction gains of the area of attention and estimated white-balance correction gains of surrounding areas adjoining the area of attention (step S4). Then, if the estimated correction gain of the area of attention is different from all of the estimated correction gains of the surrounding areas adjoining the area of attention by a predetermined amount or more, it is determined that the estimated white-balance correction gain of the area of attention is peculiar. Otherwise, it is determined that the estimated white-balance correction gain of the area of attention is not peculiar.

FIGS. 4A and 4B are explanatory diagrams showing examples of the white-balance correction gain map corresponding to all the areas of the inputted image estimated by the WB correction gain estimator 12 and white-balance correction gains determined to be peculiar by the WB correction gain peculiarity determiner 13, in the multi-area white-balance control device 1 of FIG. 1.

The examples of FIGS. 4A and 4B show an example in which the WB correction gain peculiarity determiner 13 is configured to determine that the estimated white-balance correction gain of the area of attention is peculiar if the estimated white-balance correction gain of the area of attention is different from all of the estimated white-balance correction gains of the surrounding areas adjoining the area of attention by 0.2 or more and, otherwise, determine that the estimated white-balance correction gain of the area of attention is not peculiar.

More specifically, in the example of FIG. 4A, an estimated white-balance correction gain of an area (1, 5) is "0.7" in an R/G white-balance correction gain map, and there is a difference of 0.2 or more from an estimated white-balance correction gain "1.1" of all 3×3 areas adjoining the area of attention. Therefore, the WB correction gain peculiarity determiner 13 determines the estimated white-balance correction gain "0.7" of the area (1, 5) to be peculiar.

On the other hand, estimated white-balance correction gains of areas (3, 3) and (3, 4) are "0.8" and are different from estimated white-balance correction gains "1.1" of most of 3×3 areas adjoining the areas (3, 3) and (3, 4) by 0.2 or more. However, there is no difference between the adjoining areas (3, 3) and (3, 4) in terms of the estimated white-balance correction gain since their estimated white-balance correction gains are "0.8". In this case, the WB correction gain peculiarity determiner 13 determines the estimated white-balance correction gain "0.8" of the areas (3, 3) and (3, 4) not to be peculiar.

Further, in the example of FIG. 4B, an estimated white-balance correction gain of the area (1, 5) is "0.8" in a B/G white-balance correction gain map, and there is a difference of 0.2 or more from all estimated white-balance correction gains "1.2" of the 3×3 areas adjoining the area of attention. Therefore, the WB correction gain peculiarity determiner 13 determines the estimated white-balance correction gain "0.8" of the area (1, 5) to be peculiar.

On the other hand, estimated white-balance correction gains of areas (3, 3) and (3, 4) are "1" and are different from estimated white-balance correction gains "1.2" of most of 3×3 areas adjoining the areas (3, 3) and (3, 4) by 0.2 or more. However, there is no difference between the adjoining areas (3, 3) and (3, 4) in terms of the estimated white-balance correction gain since their estimated white-balance correction gains are "1". In this case the WB correction gain peculiarity determiner 13 determines the estimated white-balance correction gain "1" of the areas (3, 3) and (3, 4) not to be peculiar.

A determination criterion about whether an estimated white-balance correction gain is peculiar or not by the WB correction gain peculiarity determiner 13 can be variously set according to "surrounding areas adjoining an area of attention" or a "difference between an estimated white-balance correction gain of an area of attention and estimated white-balance correction gains of surrounding areas adjoining the area of attention".

As a criterion for the "surrounding areas adjoining an area of attention", for example, criteria as shown below can be used:

(Criterion 1-1) 3×3 areas adjoining an area of attention
(Criterion 1-2) Upper, lower, left and right areas adjoining an area of attention In the example of FIGS. 4A and 4B, the criterion 1-1 is used for convenience sake.

Further, as a criterion for the "difference between an estimated white-balance correction gain of an area of attention and estimated white-balance correction gains of surrounding areas adjoining the area of attention", for example, criteria as shown below can be used.

(Criterion 2-1) For one white-balance correction gain, a simple difference between the estimated white-balance correction gains of an area of attention and surrounding areas adjoining the area of attention (Criterion 2-2) A Euclidean distance between points at which an estimated white-balance correction gain of an area of attention and estimated white-balance correction gains of surrounding areas adjoining the area of attention are plotted when a plurality of kinds of estimated white-balance correction gain maps are plotted on n-dimensional coordinates (Criterion 2-3) A value obtained by adding up absolute values of differences between estimated white-balance correction gains of an area of attention and estimated white-balance correction gains of surrounding areas adjoining the area of attention in a plurality of kinds of estimated white-balance correction gain maps.

In the example of FIGS. 4A and 4B, the criterion 2-1 is used for convenience sake. Details of the criterion 2-2 and the criterion 2-3 will be described later.

This determination by the WB correction gain peculiarity determiner 13 about whether an estimated white-balance correction gain is peculiar or not (step S4) is sequentially performed for all the areas and repeated until the determination for all the areas ends.

After the determination by the WB correction gain peculiarity determiner 13 about whether the white-balance correction gain is peculiar or not for all the areas ends, the WB correction gain modifier 14 modifies an estimated white-balance correction gain of an area determined to be peculiar by the WB correction gain peculiarity determiner 13, based on estimated white-balance correction gains of surrounding areas adjoining the area determined to be peculiar (step S5).

FIGS. 5A and 5B are explanatory diagrams showing examples of a white-balance correction gain map corresponding to all the areas of the inputted image in which the WB correction gain modifier 14 has modified estimated white-balance correction gains of areas determined to be peculiar by the WB correction gain peculiarity determiner 13 based on estimated white-balance correction gains of surrounding areas adjoining the areas determined to be peculiar, in the multi-area white-balance control device 1 of FIG. 1.

In the example of FIG. 5A, the WB correction gain modifier 14 modifies the estimated white-balance correction gain "0.7" of the area (1, 5) determined to be peculiar by the WB correction gain peculiarity determiner 13 in the R/G white-balance correction gain map shown in FIG. 4A to an average value "1.1" of the estimated white-balance correction gains of the surrounding 3×3 areas of the area (1, 5).

Further, in the example of FIG. 5B, the WB correction gain modifier 14 modifies the estimated white-balance correction gain "0.8" of the area (1, 5) determined to be peculiar by the WB correction gain peculiarity determiner 13 in the B/G white-balance correction gain map shown in FIG. 4B to an average value "1.2" of the estimated white-balance correction gains of the surrounding 3×3 areas of the area (1, 5).

A criterion for "estimated white-balance correction gains of surrounding areas adjoining an area determined to be peculiar" used for the modification of an estimated white-balance correction gain of an area determined to be peculiar by the WB correction gain modifier 14 can be variously set according to the "surrounding areas adjoining an area determined to be peculiar".

As a criterion for the "surrounding areas adjoining the area determined to be peculiar", for example, criteria as shown below can be used:

(Criterion 3-1) 3×3 areas adjoining an area determined to be peculiar (Criterion 3-2) Upper, lower, left and right areas adjoining an area determined to be peculiar (Criterion 3-3) Surrounding areas within a predetermined radius range around an area determined to be peculiar, including surrounding areas adjoining the area determined to be peculiar (areas corresponding to the criterion 3-1 or the criterion 3-2)

In the examples of FIGS. 5A and 5B, the criterion 3-1 is used for convenience sake.

This modification of the estimated white-balance correction gain of the area determined to be peculiar by the WB correction gain modifier 14 (step S5) is sequentially performed for all the areas and repeated until the modification for all the areas ends.

As a result, the white-balance correction gain maps of the entire inputted image in which estimated white-balance correction gains of areas determined to be peculiar, among the estimated white-balance correction gains of all the areas, have been modified, as shown in FIGS. 5A and 5B are obtained.

The obtained white-balance correction gain maps are stored into the gain map storage 16.

Then, the WB gain corrector 17 corrects the white balance by applying a gain inputted from the gain map storage 16 to a pixel value of each color, correspondingly to a position on the inputted image, and outputs the image.

According to the multi-area white-balance control device 1 and the multi-area white-balance control method of the present embodiment, whether an estimated white-balance correction gain of an area of attention is peculiar or not is determined based on comparison with estimated white-balance correction gains of surrounding areas adjoining the area of attention, and an estimated white-balance correction gain of an area determined to be peculiar is modified based on the estimated white-balance correction gains of the surrounding areas adjoining the area determined to be peculiar. Therefore, it is possible to, even if a white-balance correction gain initially estimated in an individual area is wrong, create a white-balance correction gain map in which the values of white-balance correction gains of all areas are appropriate, corresponding to an inputted image. When the white balance of the entire inputted image is corrected based on the white-balance correction gain map of the entire inputted image in which the white-balance correction gain of the area for which estimation was wrongly performed has been modified, color reproduction without unnaturalness can be realized in which an adverse effect does not occur in white-balance correction of the entire inputted image, and color balance of the area of attention in the entire inputted image is appropriately maintained.

Figure 6A:
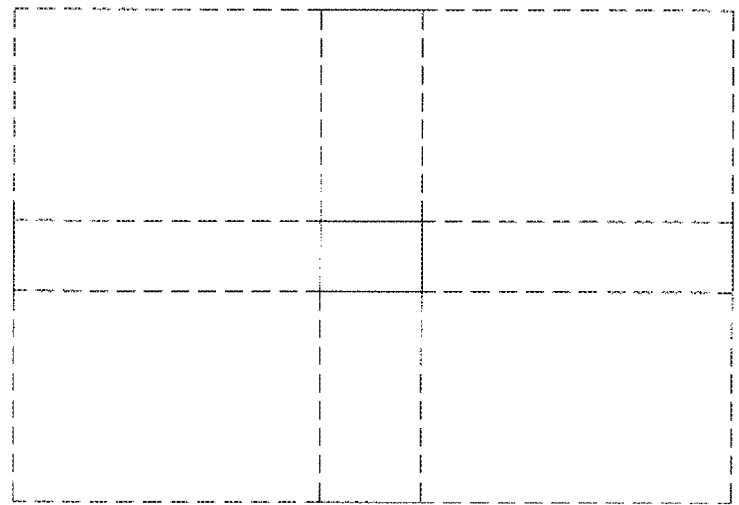
FIGS. 6A and 6B are explanatory diagrams showing modifications of an aspect of division by the area dividing means, respectively, in the multi-area white-balance control device of FIG. 1.

Though the image-area divider 11 is configured to divide an inputted image into a plurality of areas in a manner that mutually adjoining areas do not overlap with each other in the above example, the image-area divider 11 may be configured to divide an inputted image into a plurality of areas in a manner that mutually adjoining areas are partially overlapped as shown by broken lines in FIG. 6A.

Figure 6B:
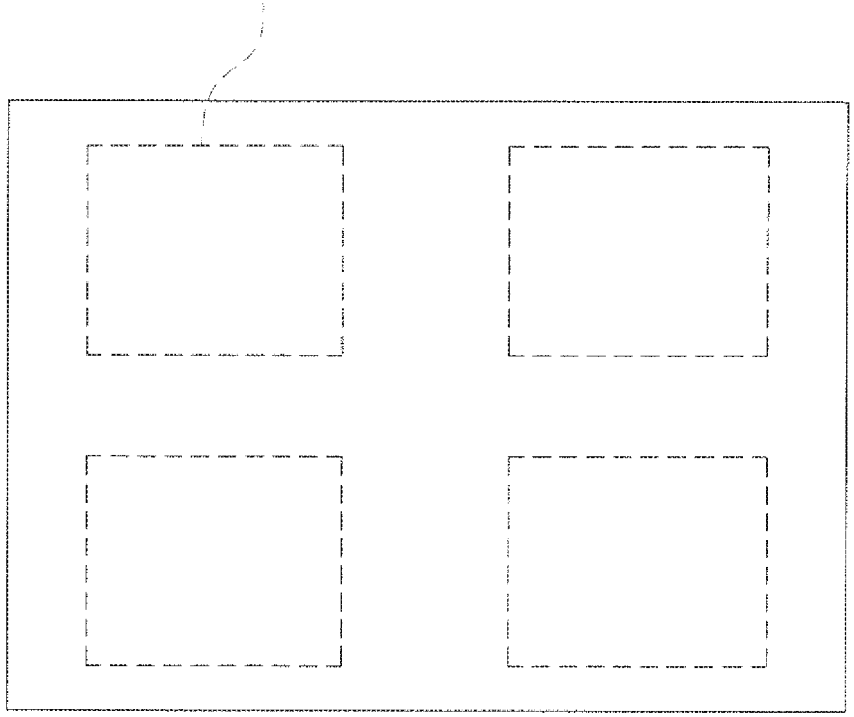

Otherwise, the image-area divider 11 may be configured to divide an inputted image into a plurality of areas in a manner that mutually adjoining areas are separated from each other as shown by broken line in FIG. 6B.

Further, though, in the example of 4A and 4B, the WB correction gain peculiarity determiner 13 uses simple differences between an estimated white-balance correction gain of an area of attention and estimated white-balance correction gains of surrounding areas adjoining the area of attention, for each of an R/G white-balance correction gain and a R/B white-balance correction gain of the criterion 2-1, as a criterion for the "difference between an estimated white-balance correction gain of an area of attention and estimated white-balance correction gains of surrounding areas adjoining the area of attention" for the criteria for determining whether a white-balance correction gain is peculiar or not as described above, a Euclidean distance between points at which an estimated white-balance correction gain of an area of attention and surrounding areas adjoining the area of attention are plotted, which is the criterion 2-2, or a value obtained by adding up absolute values of differences between estimated white-balance correction gains of an area of attention and estimated white-balance correction gains of surrounding areas adjoining the area of attention in a plurality of kinds of estimated white-balance correction gain maps, which is the criterion 2-3, may be used.

Figures 7A, 7B:
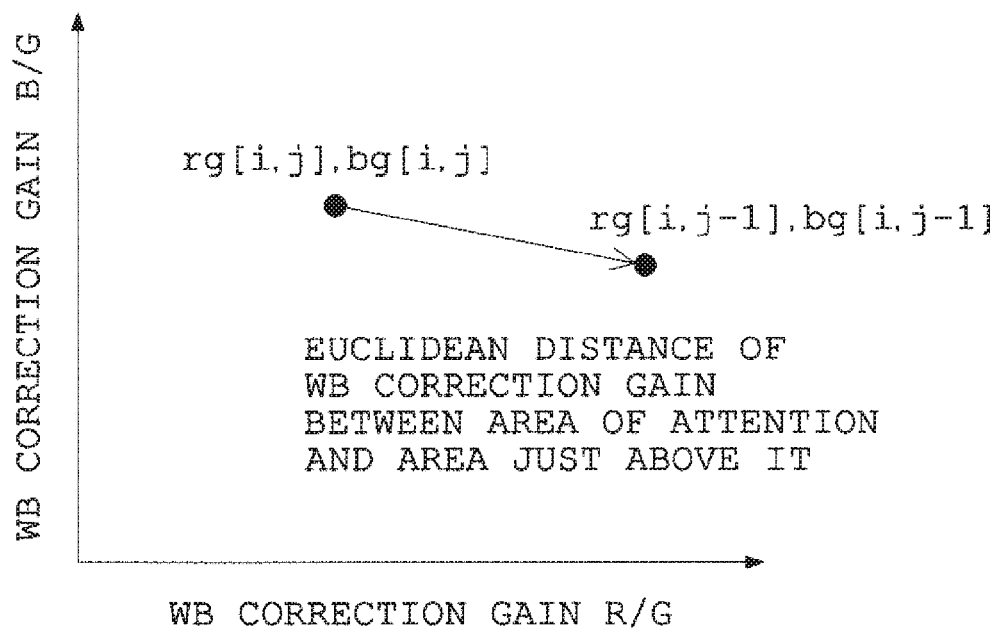
FIGS. 7A and 7B are explanatory diagrams showing a modification of a method for the white-balance correction gain peculiarity determining means to determine that estimated white-balance correction gains of an area of attention to be peculiar, in the multi-area white-balance control device of FIG. 1.

FIGS. 7A and 7B are explanatory diagrams showing an example of using the criterion 2-2 for the "difference between an estimated white-balance correction gain of an area of attention and estimated white-balance correction gains of surrounding areas adjoining the area of attention" as a modification of a method for the WB correction gain peculiarity determiner 13 to determine that estimated white-balance correction gains of an area of attention are peculiar, in the multi-area white-balance control device 1 of FIG. 1. FIG. 7A is a diagram showing the estimated white-balance correction gains of the area of attention and each of the estimated white-balance correction gains of the surrounding areas adjoining the area of attention; and FIG. 7B is a diagram showing, as an example of a difference between the white-balance correction gains of the area of attention and white-balance correction gains of one area among the surrounding areas adjoining the area of attention, a distance between points indicating the white-balance correction gains of the area of attention and the one area among the surrounding areas adjoining the area of attention, when an R/G white-balance correction gain and a B/G white-balance correction gain are indicated by one coordinate axis and the other coordinate axis, respectively, on the XY coordinates.

FIG. 7A shows estimated white-balance correction gains rg[ ] and bg[ ] of an area of attention [i, j] in the center and its eight adjacent areas.

In the case of, in the example of FIG. 7A, determining whether the estimated white-balance of the area of attention are peculiar or not, based on differences between the estimated white-balance correction gains of the area of attention and the estimated white-balance correction gains of the surrounding areas using the criterion 2-2, each of the differences between the white-balance corrections gain of the area of attention [i, j] and the white-balance correction gains of the surrounding areas is determined first.

When each of rg[i, j] and bg[i, j] in FIG. 7A is assumed to be an estimated white-balance correction gain of the area of attention [i, j], a Euclidean distance, which is a distance between a point (rg[i, j], bg[i, j]) indicating the white-balance correction gains of the area of attention and a point indicating white-balance correction gains of an immediately upper area (rg[i, j−1], bg[i, j−1]) on the XY coordinates shown in FIG. 7B, is calculated as an example of difference between the white-balance correction gains of the area of attention and the white-balance correction gains of the immediately upper area.

Similarly, by calculating each of the differences between the white-balance correction gains of the area of attention and white-balance correction gains of eight surrounding areas and comparing each calculated value with a predetermined threshold, which is the largest value of difference determined in advance, it is determined whether the white-balance correction gains of the area of attention are peculiar or not.

A Euclidean distance d can be indicated by the following formula 1 relative to n-dimensional vectors f and g.

$$d(f, g) = \sqrt{\sum_{i=1}^{n} (f_i - g_i)^2} \quad \text{(formula 1)}$$

For example, relative to two-dimensional vectors f and g, the Euclidean distance d is indicated by the following formula 2.

$$d(f, g) = \sqrt{\sum_{i=1}^{2} (f_i - g_i)^2} \quad \text{(formula 2)}$$

Here, when the Euclidean distance relative to the two-dimensional vectors f(x1, y1) and g(x2, y2) is denoted by S, the Euclidean distance S can be indicated by the following formula 3.

$$S = \sqrt{(x_1 - x_2)^2 + (y_1 - y_2)^2} \quad \text{(formula 3)}$$

An example of how to determine the Euclidean distance S between an area of attention and surrounding areas adjoining the area of attention for the R/G white-balance correction gains and the B/G white-balance correction gains shown in FIGS. 4A and 4B, using the above formula 3 will be described.

An R/G white-balance correction gain and a B/G white-balance correction gain are assumed to be a value on an x coordinate in the xy coordinate system and a value on a y coordinate in the xy coordinate system, respectively. For each of the division areas, the R/G white-balance correction gain and B/G white-balance correction gain maps shown in FIGS. 4A and 4B are plotted on the xy coordinate system. At this time, a difference between a position $f(x_1, y_1)$ of a plotted point of an area of attention on the xy coordinates and a position $g(x_2, y_2)$ of a plotted point of a surrounding area adjoining the area of attention on the xy coordinates can be indicated as the Euclidean distance S by the above formula 3.

For example, when a difference between a position f(0.7, 0.8) on the xy coordinates, which is a point where the estimated R/G white-balance correction gain and the B/G white-balance correction gain in the area (1, 5) are plotted on the xy coordinate system, and a position g(1.1, 1.1) on the xy coordinates, which is a point where the estimated R/G white-balance correction gain and the B/G white-balance correction gain in the area (1, 4), one of the 3×3 areas adjoining the area (1, 5), are plotted on the xy coordinate system is indicated by the Euclidean distance S, the following result is obtained:

$$\{(0.7-1.1)^2 + (0.8-1.1)^2\}^{1/2} = 0.5$$

An arbitrary value is set in advance as a threshold of Euclidean distance S in the WB correction gain peculiarity determiner 13, and the WB correction gain peculiarity determiner 13 determines estimated white-balance correction gains of the area of attention to be peculiar if all of Euclidean distances S between the area of attention and the surrounding areas adjoining the area of attention determined as described above exceed the threshold of Euclidean distance S and, otherwise, determines the estimated white-balance correction gains of the area of attention not to be peculiar.

In the example of FIGS. 4A and 4B, two kinds of white-balance correction gains, the R/G white-balance correction gain and the B/G white-balance correction gain, in a color image of three RGB colors are estimated, and the Euclidean distance can be easily understood as the distance S between plotted points obtained by plotting the two kinds of white-balance correction gains on a two-dimensional coordinates. However, the number of kinds of white-balance correction gains which can be estimated is not limited to two.

For example, in the case of estimating white-balance correction gains in a multi-color image or the like, the number of kinds of white-balance correction gains to be estimated increases, so that the white-balance correction gains cannot be plotted on a two-dimensional coordinates.

Even in that case, it is possible to, by calculating a Euclidean distance as a criterion indicating a difference between white-balance correction gains of adjoining areas based on the above formula 1, determine whether white-balance correction gains of an area of attention is peculiar or not.

As another modification of the method for the WB correction gain peculiarity determiner 13 to determine estimated white-balance correction gains of an area of attention to be peculiar in the multi-area white-balance control device 1 of FIG. 1, an example using the criterion 2-3 will be described.

As the method for determining differences between the white-balance correction gains of the area [i, j] and the white-balance correction gains of the eight surrounding areas as shown in FIG. 7A, absolute values of differences between white-balance correction gains of an area of attention and white-balance correction gains of surrounding areas, which is the criterion 2-3, can be used instead of the Euclidean distance of the criterion 2-2.

For example, as an absolute value of a difference of a white-balance correction gain of an area of attention and a white-balance correction gain of a surrounding area, |rg[i, j]−rg[i, j−1]| is used.

Similarly, by calculating each of the differences between the white-balance correction gain of the area of attention and white-balance correction gains of eight surrounding areas and comparing each calculated value with a predetermined threshold, which is the largest value of difference determined in advance, it is determined whether the white-balance correction gain of the area of attention is peculiar or not.

Though an absolute value of a difference of rg[ ] is used in the above description for convenience sake, an absolute value of a difference of bg[ ] may be, of course, used instead of the absolute value of a difference of rg[ ].

An example of the value obtained by adding up absolute values of differences between estimated white-balance correction gains of an area of attention and estimated white-balance correction gains of surrounding areas adjoining the area of attention in a plurality of kinds of estimated white-balance correction gain maps, which is the criterion 2-3, will be described with the use of an area of attention and surrounding areas adjoining the area of attention for the R/G white-balance correction gain and the B/G white-balance correction gain shown in FIGS. 4A and 4B.

For example, in FIGS. 4A and 4B, the estimated value of the R/G white-balance correction gain and the estimated value of the B/G white-balance correction gain in the area (1, 5) are "0.7" and "0.8", respectively. Further, the estimated value of the R/G white-balance correction gain and the estimated value of the B/G white-balance correction gain in one area (1, 4) among the 3×3 areas adjoining the area (1, 5) are "1.1" and "1.2", respectively.

In this case, the value obtained by adding up absolute values of differences between the estimated white-balance correction gains of the area of attention and estimated white-balance correction gains of the surrounding areas adjoining the area of attention in the plurality of kinds of estimated white-balance correction gain maps, which is the criterion 2-3, is as follows:

$$|0.7-1.1|+|0.8-1.2|=0.8$$

An arbitrary value is set in the WB correction gain peculiarity determiner 13 in advance as a threshold of the value obtained by adding up absolute values of differences between estimated white-balance correction gains of an area of attention and estimated white-balance correction gains of surrounding areas adjoining the area of attention. The WB correction gain peculiarity determiner 13 determines a white-balance correction gain of an area of attention to be peculiar if all of values, each of which is obtained by adding up absolute values of differences between estimated white-balance correction gains of an area of attention and estimated white-balance correction gains of each surrounding area adjoining the area of attention, determined as described above exceed the threshold of the value obtained by adding up absolute values of differences between estimated white-balance correction gains, and, otherwise, determines the white-balance correction gain of the area of attention not to be peculiar.

Further, though the image-area divider 11 divides the inputted image into 7×7 in the examples of FIG. 3 to FIGS. 5A and 5B in the present embodiment, the size and number of the areas divided by the image-area divider 11 may be any size and number.

FIGS. 8A and 8B are explanatory diagrams showing R/G white-balance correction gain maps at the time when the image-area divider 11 has divided the inputted image into a plurality of areas with a size different from the size of the example of FIG. 3 in the multi-area white-balance control device 1 of FIG. 1 as modification of the present embodiment. FIG. 8A is a diagram showing an R/G white-balance correction gain map and white-balance correction gains determined to be peculiar by the white-balance correction gain peculiarity determining means before modification; and FIG. 8B is a diagram showing an R/G white-balance correction gain map in which the estimated white-balance correction gains of areas determined to be peculiar have been modified.

In the present embodiment, if it is known that lighting sources for an upper left area and a lower right area of an inputted image are different, the image-area divider 11 can divide areas from a lower left to an upper right into small-sized areas and divide other areas into large-sized areas, as in the examples of FIGS. 8A and 8B.

That is, in the example of FIG. 8A, the image-area divider 11 has divided the inputted image into 3×3 areas, and further divides each of the lower left area, a central area and the upper right area, among the 3×3 division areas, into 2×2.

Here, a value of a white-balance correction gain estimated by the WB correction gain estimator 12 for a lower left small area, among the four small areas generated by further dividing the upper right area into 2×2, is "0.7". Further, a difference of the small area front"1.1", the value of estimated white-balance correction gains of areas surrounding the small area, is "0.4", which exceeds the white-balance correction gain threshold. Therefore, the WB correction gain peculiarity determiner 13 determines the estimated white-balance correction gain of the small area to be peculiar.

On the other hand, a value of white-balance correction gains estimated by the WB correction gain estimator 12 for lower left and lower right small areas, among the four small areas generated by further dividing the central area into 2×2, is also "0.7". Further, the difference of each of the small areas from "1.1", the value of an estimated white-balance correction gain of most of areas surrounding the small area, is "0.4", which exceeds the white-balance correction gain threshold. However, there is not difference between the values of the estimated white-balance correction gains of the adjoining small areas. Therefore, the WB correction gain peculiarity determiner 13 determines the estimated white-balance correction gains of these small areas not to be peculiar.

In this case, the WB correction gain modifier 14 modifies the estimated white-balance correction gain "0.7" of the lower left small area, among the areas obtained by further dividing the upper right area into 2×2, which has been determined to be peculiar by the WB correction gain peculiarity determiner 13 to an average value "1.1" of the estimated white-balance correction gains of the areas surrounding the small area, as shown in the white-balance correction gain map of FIG. 8B.

Second Embodiment

Figure 9:
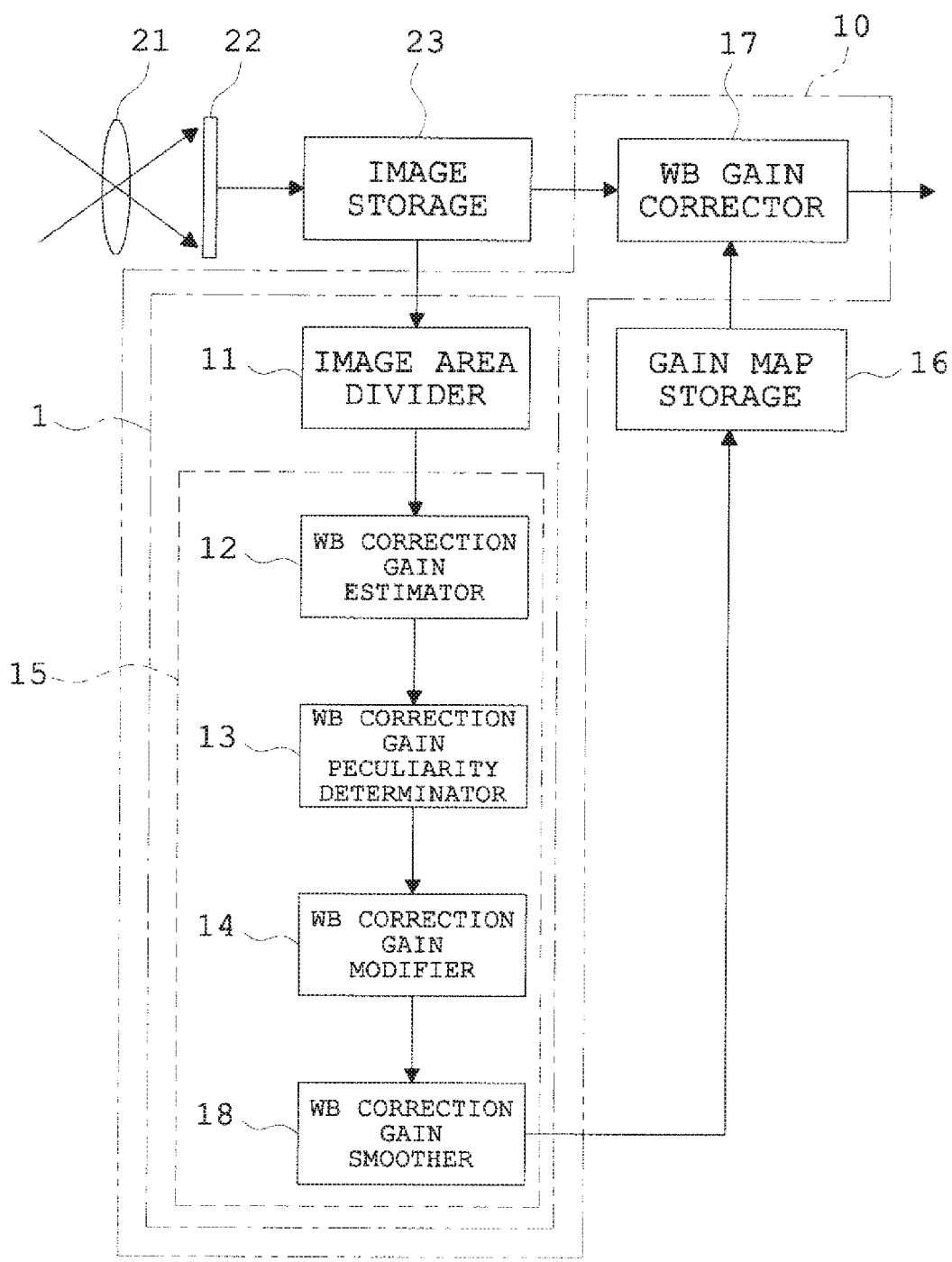
FIG. 9 is a block diagram of a digital camera provided with a multi-area white-balance control device according to a second embodiment of the present invention.
Figure 10:
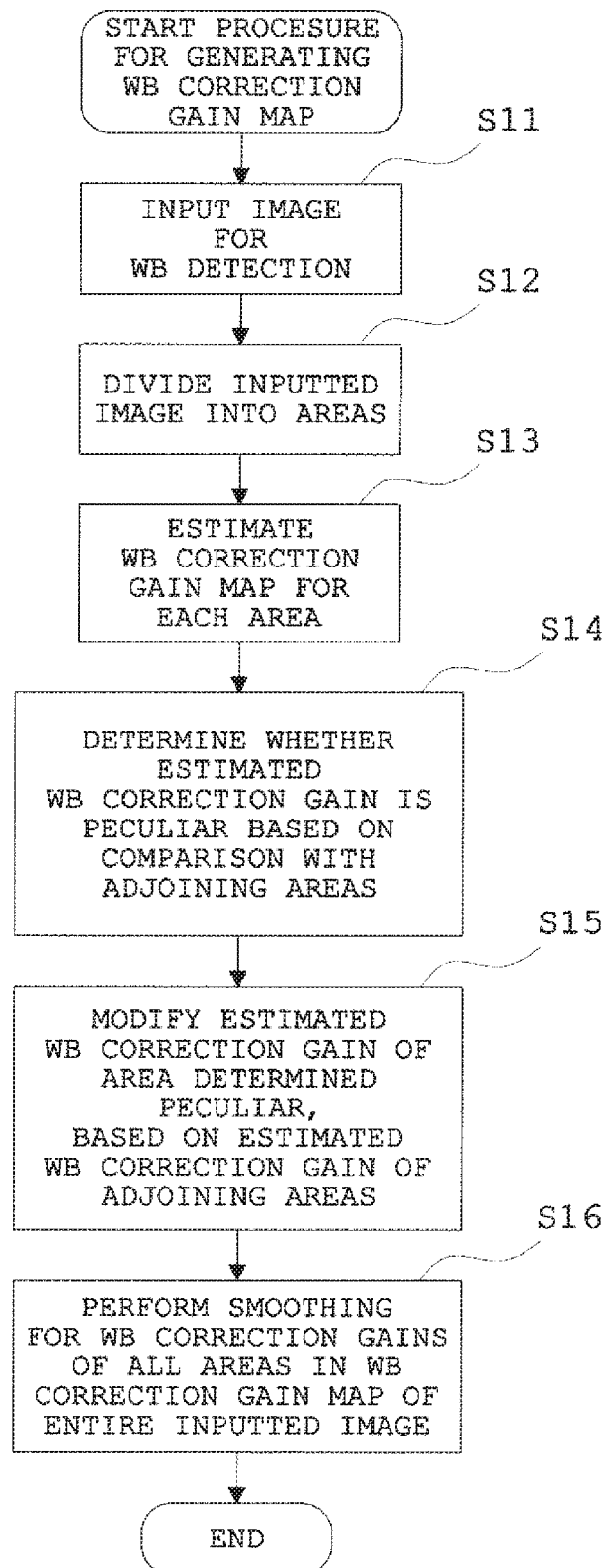
FIG. 10 is a flowchart showing a process procedure performed until, from an inputted image in the multi-area white-balance control device of FIG. 9, a white-balance correction gain map of the entire inputted image, in which an estimated white-balance correction gain of an area determined to be peculiar has been modified, and, further, white-balance correction gains of all areas have been smoothed, is generated.

FIG. 9 is a block diagram of a digital camera provided with a multi-area AWB (auto white-balance) control device according to a second embodiment of the present invention. In FIG. 9, a part surrounded by a one-dot chain line and a part surrounded by a two-dot chain line are configurations corresponding to the multi-area white-balance control device according to the present embodiment and a multi-area white-balance image-processing device according to the present embodiment, respectively. FIG. 10 is a flowchart showing a process procedure performed until, from an inputted image in the multi-area white-balance control device of FIG. 9, a white-balance correction gain map of the entire inputted image, in which an estimated white-balance correction gain of an area determined to be peculiar has been modified, and, further, white-balance correction gains of all areas have been smoothed, is generated.

A multi-area white-balance control device 1 of the present embodiment has an image-area divider 11 as area dividing means, a WB (white-balance) correction gain estimator 12 as white-balance correction gain estimating means, a WB (white-balance) correction gain peculiarity determiner 13 as white-balance correction gain peculiarity determining means, a WB (white-balance) correction gain modifier 14 as white-balance correction gain modification means, a WB correction gain smoother 18 as white-balance correction gain smoothing means, and a WB (white-balance) gain corrector 17 as white-balance processor as shown in FIG. 9. In FIG. 9, reference numeral 10 denotes a multi-area white-balance image-processing device, reference numeral 15 denotes a WB (white-balance) correction gain map generator as white-balance correction gain map generating means, reference numeral 16 denotes a gain map storage which stores a white-balance correction gain map of an entire inputted image in which a white-balance correction gain of an area of attention has been modified by the WB (white-balance) gain corrector 17, reference numeral 17 denotes a WB (white-balance) gain corrector as the white-balance processor, reference numeral 21 denotes a lens, reference numeral 22 denotes an image sensor, and reference numeral 23 denotes an image storage which stores an image captured by the image sensor 22.

Configurations of the image-area divider 11, the WB correction gain estimator 12, the WB correction gain peculiarity determiner 13 and the WB correction gain modifier 14 are substantially the same as those of the multi-area white-balance control device 10 of the first embodiment.

The WB correction gain smoother 18 performs a smoothing process such as an averaging LPF (low pass filtering) for white-balance correction gains of all areas in a white-balance correction gain map of an entire inputted image in which a white-balance correction gain of an area of attention has been modified by the WB correction gain modifier 14.

Details of the smoothing process will be described later.

The WB gain corrector 17 corrects white balance of the entire inputted image based on the white-balance correction gain map of the entire inputted image in which the white-balance correction gains of all the areas have been smoothing-processed by the WB correction gain smoother 18.

Other components are substantially the same as those of the multi-area white-balance control device 1 of the first embodiment.

The flow of a process until, from an inputted image, a white-balance correction gain map of the entire inputted image, in which an estimated white-balance correction gain of an area determined to be peculiar has been modified, and, furthermore, white-balance correction gains of all areas have been smoothed is generated, using the multi-area white-balance control device of the present embodiment configured as described above will be described with the use of FIG. 10 and FIGS. 11A and 11B.

A process from input of image data by a control section of the digital camera not shown (step S11) to modification of an estimated white-balance correction gain of an area determined to be peculiar by the WB correction gain modifier 14 (step S15) is substantially the same as that of the multi-area white-balance control device 10 of the first embodiment.

After the modification of the estimated white-balance correction gain of the area determined to be peculiar, by the WB correction gain modifier 14 (step S15) ends, the WB correction gain smoother 18 performs the smoothing process for white-balance correction gains of all areas in the white-balance correction gain map of the entire inputted image (step S16).

For example, for all the areas shown in FIGS. 5A and 5B as targets, the WB correction gain smoother 18 applies, for each area, averaging LPF to the white-balance correction gains of 3×3 areas with the area as the center. If the number of surrounding areas adjoining the area to be the center is smaller than 3×3, averaging LPF is applied for a range of surrounding areas adjoining the area to be the center.

More specifically, for example, in a case where the WB correction gain smoother 18 applies, to an area (3, 1) in the R/G white-balance correction gain map shown in FIG. 5A, averaging LPF for R/G white-balance correction gains of 3×3 areas with the area (3, 1) as the center, all of values of the R/G white-balance correction gains of the 3×3 areas (2,0) to (2,2), (3,0) to (3,2), and (4,0) to (4,2) with the area (3, 1) as the center are "1.1". In this case, a value of the white-balance correction gain of the area (3, 1) after application of averaging LPF has not changed from the value before application of averaging LPF.

On the other hand, in a case where the WB correction gain smoother 18 applies, to the area (3, 2), averaging LPF for R/G white-balance correction gains of 3×3 areas with the area (3, 2) as the center, values of the R/G white-balance correction gains of the areas (2,1) to (2,3), (3,1), (3,2), and (4,1) to (4,3) among the 3×3 areas as the area (3, 2) as the center are "1.1", and a value of the R/G white-balance correction gain of the area (3, 3) is "0.8". In this case, when averaging LPF is applied, the following result is obtained:

$$(1.1 \times 8 + 0.8) \div 9 \approx 1.07$$

Thus, the value of the R/G white-balance correction gain of the area (3, 2) after application of averaging LPF becomes smaller by "0.03" in comparison with "1.1" before application of averaging LPF.

Further, in a case where the WB correction gain smoother 18 applies, to the area (3, 3), averaging LPF for R/G white-balance correction gains of 3×3 areas with the area (3, 3) as the center, values of the R/G white-balance correction gains of areas (2,2) to (2,4), (3,2), (3,4), and (4,2) to (4,4) among the 3×3 areas as the area (3, 3) as the center are "1.1", and values of the R/G white-balance correction gains of the areas (3, 3) and (3, 4) are "0.8". In this case, when averaging LPF is applied, the following result is obtained.

$$(1.1 \times 7 + 0.8 \times 2) \div 9 \approx 1.03$$

Thus, the value "1.03" of the R/G white-balance correction gain of the area (3, 3) after application of averaging LPF becomes larger by "0.23" in comparison with "0.8" before application of averaging LPF.

Similarly as described above, when the WB correction gain smoother 18 applies averaging LPF to the R/G white-balance correction gain of each area, values of R/G white-balance correction gains of areas (2,2) to (2,5), (3,2) to (3,5), (4,2) to (4,5) become values within a range of "1.03" to "1.07" as shown in FIG. 11A. The maximum value of difference between the R/G white-balance correction gains of the areas (3, 3) and (3, 4) and the R/G white-balance correction gains of areas adjoining those areas becomes 1.07−1.03=0.04, which is "0.26" smaller than "0.3" before application of averaging LPF. On the other hand, the maximum value of difference between the R/G white-balance correction gains of the areas (2, 2) to (2, 5), (3, 2), (3, 5), (4, 2) to (4, 5) and the R/G white-balance correction gains of areas adjoining the areas becomes 1.1−1.03=0.07, which is "0.07" larger than "0" before application of averaging LPF.

Similarly, when the WB correction gain smoother 18 applies averaging LPF to an B/G white-balance correction gain of each area shown in FIG. 5B, values of B/G white-balance correction gains of the areas (2,2) to (2,5), (3,2) to (3,5), (4,2) to (4,5) become values within a range of "1.16" to "1.18" as shown in FIG. 11B. The maximum value of difference between the B/G white-balance correction gains of the areas (3, 3) and (3, 4) and the B/G white-balance correction gains of adjacent areas becomes 1.18−1.16=0.02, which is "0.18" smaller than "0.2" before application of averaging LPF. On the other hand, the maximum value of difference between the B/G white-balance correction gains of the areas (2, 2) to (2, 5), (3, 2), (3, 5), (4, 2) to (4, 5) and the B/G white-balance correction gains of adjacent areas becomes 1.2-1.16=0.04, which is "0.04" larger than "0" before application of averaging LPF.

In a case where the WB correction gain smoother 18 applies averaging LPF to each of areas (0, 4) to (0, 6), (1, 4), (1, 6), (2, 4) to (2, 6) adjoining the area (1, 5) the estimated white-balance correction gain of which has been determined to be peculiar by the WB correction gain peculiarity determiner 13, in each of the R/G white-balance correction gain map and the B/G white-balance correction gain map shown in FIGS. 4A and 4B, values of the R/G white-balance correction gain and B/G white-balance correction gain of the area (1, 5) have been modified to average values of the R/G white-balance correction gains and the B/G white-balance correction gains of the areas (0,4) to (0,6), (1,4), (1,6), (2,4) to (2,6) adjoining the area (1, 5) ("1.1" in the example of FIG. 4A, and "1.2" in the example of FIG. 4B) by the WB correction gain modifier 14 as shown in FIGS. 5A and 5B. Therefore, even if the WB correction gain smoother 18 applies averaging LPF to each of the areas (0,4) to (0,6), (1,4), (1,6), (2,4) to (2,6), the fluctuation range between the values of the R/G white-balance correction gains and B/G white-balance correction gains of these areas and the values before application of averaging LPF is extremely small (in the examples of FIGS. 11A and 11B, the fluctuation range is "0").

As comparison examples to be compared with the above, FIGS. 12A and 12B show an R/G white-balance correction gain map and a B/G white-balance correction gain map in a case where a smoothing process similar to the above description (for each area, averaging LPF for white-balance correction gains of 3×3 areas with the area as the center) is performed for the R/G white-balance correction gain map and the B/G white-balance correction gain map shown in FIGS. 4A and 4B, without performing modification of an estimated white-balance correction gain of an area to be determined to be peculiar.

When averaging LPF similar to the above description is applied without modification of an estimated white-balance correction gain of an area to be determined to be peculiar, the estimated white-balance correction gains of the areas (0,4) to (0,6), (1,4), (1,6), (2,4) to (2,6) to be determined not to be peculiar are influenced by the estimated white-balance correction gain of the area (1, 5) to be determined to be peculiar and significantly fluctuate.

For example, as shown in FIG. 12A, the values of the R/G white-balance correction gains of the 3×3 areas (0, 4) to (0, 6), (1, 4) to (1, 6), (2, 4) to (2, 6) with the area (1, 5) to be determined to be peculiar as the center become values within a range of "0.98" to "1.06". The maximum value of difference between the R/G white-balance correction gain of the area (1, 5) and the R/G white-balance correction gains of the areas adjoining the area becomes 1.06-0.98=0.08, which is "0.32" smaller than "0.4" before application of averaging LPF. On the other hand, the maximum value of difference of the R/G white-balance correction gains of the areas (0, 4) to (0, 6), (1, 4), (1, 6), (2, 4) to (2, 6) and R/G white-balance correction gains of areas adjoining these areas becomes 1.1−1.03=0.07, which is "0.23" smaller than "0.3" before application of averaging LPF.

However, a fluctuation range of the R/G white-balance correction gains of the areas (0, 4) to (0, 6), (1, 4), (1, 6), (2, 4) to (2, 6) from the initial estimated values is large in comparison with the R/G white-balance correction gain in the case where the WB correction gain smoother 18 applies averaging LPF after modification of an estimated white-balance correction gain of an area determined to be peculiar is performed, which is shown in FIG. 11A. For example, the R/G white-balance correction gain of the area (2, 4) becomes "0.98", which indicates fluctuation of as much as "0.12" from the initial estimated value "1.1". On the other hand, in the case where the WB correction gain smoother 18 applies averaging LPF after modification of an estimated R/G white-balance correction gain of an area determined to be peculiar is performed, the R/G white-balance correction gain of the area (2, 4) is "1.03", which indicates a fluctuation range from the initial estimated value "1.1" is "0.07". The fluctuation range can be suppressed small in comparison with the case where averaging LPF is applied without performing modification of an estimated R/G white-balance correction gain of an area determined to be peculiar.

Similarly, the values of the B/G white-balance correction gains of the 3×3 areas (0, 4) to (0, 6), (1, 4) to (1, 6), (2, 4) to (2, 6) become values within a range of "1.11" to "1.16". The maximum value of difference between the B/G white-balance correction gain of the area (1, 5) and the B/G white-balance correction gains of the areas adjoining the area becomes 1.16-1.1=0.06, which is "0.34" smaller than "0.4" before application of averaging LPF. On the other hand, the maximum value of difference between the B/G white-balance correction gains of the areas (0, 4) to (0, 6), (1, 4) to (1, 6), (2, 4) to (2, 6) and the B/G white-balance correction gains of areas adjoining the areas becomes 1.2-1.13=0.07, which is "0.13" smaller than "0.2" before application of averaging LPF.

However, a fluctuation range of the B/G white-balance correction gains of the areas (0, 4) to (0, 6), (1, 4), (1, 6), (2, 4) to (2, 6) from the initial estimated values is large in comparison with the B/G white-balance correction gain in the case where the WB correction gain smoother 18 applies averaging LPF after modification of an estimated white-balance correction gain of an area determined to be peculiar is performed, which is shown in FIG. 11B. For example, the B/G white-balance correction gain of the area (2, 4) becomes "1.11", which indicates fluctuation of as much as "0.09" from the initial estimated value "1.2". On the other hand, in the case where the WB correction gain smoother 18 applies averaging LPF after modification of the estimated B/G white-balance correction gain of an area determined to be peculiar is performed, the B/G white-balance correction gain of the area (2, 4) is "1.16", which indicates a fluctuation range from the initial estimated value "1.2" is "0.04". The fluctuation range can be suppressed small in comparison with the case where averaging LPF is applied without performing modification of the estimated B/G white-balance correction gain of an area determined to be peculiar.

As apparent from the comparison with the comparison examples of FIGS. 12A and 12B, in the multi-area white-balance control device 1 of the present embodiment shown in FIGS. 11A and 11B, multi-area white-balance correction gain maps of an entire inputted image are generated in which discontinuity among values of white-balance correction gains among adjoining areas is suppressed while fluctuation of areas determined not to be peculiar is suppressed as far as possible, by the WB correction gain smoother 18 performing the smoothing process.

The smoothing-processed white-balance correction gain maps are stored into the gain map storage 16.

Then, the WB gain corrector 17 corrects the white balance by applying a gain inputted from the gain map storage 16 to a pixel value of each color, correspondingly to a position on the inputted image, and outputs the image.

According to the multi-area white-balance control device 1 and the multi-area white-balance control method of the present embodiment, since a smoothing process is further performed for white-balance correction gains of all areas in a white-balance correction gain map of an entire inputted image in which an estimated white-balance correction gain of an area determined to be peculiar has been modified, it is possible to, for an image obtained by photographing a scene illuminated by a plurality of lighting sources, further suppress discontinuity of brightness and color among areas while maintaining effects similar to the effects of the first embodiment that such an adverse effect that is caused by modification of a white-balance correction gain of an area for which the initial white-balance correction gain has been wrongly estimated does not occur in white-balance correction of the entire inputted image, and that it is possible to keep color balance of the area of attention in the entire inputted image appropriate and realize color reproduction without unnaturalness.

Though averaging LPF is simply used as the smoothing process performed by the WB correction gain smoother 18 in the multi-area white-balance control device 1 of the present embodiment, weighted LPF may be used as necessary. Further, an LPF with a large radius may be used. Further, the direction and intensity of using the LPF may differ according to differences between estimated white-balance correction gains and directions among areas.

Other operations and effects are substantially the same as those of the multi-area white-balance control device 1 and the multi-area white-balance control method of the first embodiment.

The multi-area white-balance control device 1 and the multi-area white-balance control method of the present invention have been described above. Description has been made on an example in which, in the multi-area white-balance control device 1 of each of the above embodiments, the image-area divider 11 as the area dividing means divides an inputted image into areas with equal shapes and areas which are separated by vertical and horizontal lines. However, the shape and size of each of areas divided by the area dividing means in the multi-area white-balance control device 1 of the present invention are not limited to the present embodiments. Any shape, for example, a triangular shape, a curved shape or the like is possible, and each area may have a different size.

Further, the multi-area white-balance control device 1 of each of the above embodiments may be configured with a computer in which a multi-area white-balance control program is recorded in a built-in hard disk, the multi-area white-balance control program causing the computer to function as the image-area divider 11 (area dividing means), the WB correction gain estimator 12 (white-balance correction gain estimating means), the WB correction gain peculiarity determiner 13 (white-balance correction gain peculiarity determining means) and the WB correction gain modifier 14 (white-balance correction gain modification means).

Otherwise, the multi-area white-balance control device 1 of the present embodiments may be configured with a computer-readable medium, for example, a CD-ROM or the like, in which a multi-area white-balance control program is recorded, the multi-area white-balance control program causing the computer to function as the image-area divider 11 (area dividing means), the WB correction gain estimator 12 (white-balance correction gain estimating means), the WB correction gain peculiarity determiner 13 (white-balance correction gain peculiarity determining means), the WB correction gain modifier 14 (white-balance correction gain modification means) and the WB gain corrector 17 (white-balance processor).

Furthermore, the multi-area white-balance image-processing device 10 of each of the above embodiments may be configured with a computer in which a multi-area white-balance image-processing program is recorded in a built-in hard disk, the multi-area white-balance image-processing program causing the computer to function as the image-area divider 11 (area dividing means), the WB correction gain estimator 12 (white-balance correction gain estimating means), the WB correction gain peculiarity determiner 13 (white-balance correction gain peculiarity determining means), the WB correction gain modifier 14 (white-balance correction gain modification means) and the WB gain corrector 17 (white-balance processor).

Furthermore or otherwise, the multi-area white-balance image-processing device 10 of the present embodiments may be configured with a computer-readable medium, for example, a CD-ROM or the like, in which the multi-area white-balance image-processing program is recorded, the multi-area white-balance image-processing program causing the computer to function as the image-area divider 11 (area dividing means), the WB correction gain estimator 12 (white-balance correction gain estimating means), the WB correction gain peculiarity determiner 13 (white-balance correction gain peculiarity determining means), the WB correction gain modifier 14 (white-balance correction gain modification means) and the WB gain corrector 17 (white-balance processor).

The multi-area white-balance control device, the multi-area white-balance control method, the multi-area white-balance control program, the computer in which the multi-area white-balance control program is recorded, the multi-area white-balance image-processing device, the multi-area white-balance image-processing method, the multi-area white-balance image-processing program, the computer in which the multi-area white-balance image-processing program is recorded, and the image-capture apparatus provided with the multi-area white-balance image-processing device according to the embodiments of the present invention are useful for fields in which it is required to correct white balance of a so-called image-by-mixed-lighting-sources obtained by photographing with a plurality of different kinds of lighting sources.

What is claimed is:

1. A multi-area white-balance image-processing device comprising a computer which is configured to:
   divide an inputted image into a plurality of areas;
   estimate a white-balance correction gain for each of the areas into which the inputted image is divided;
   determine whether the estimated white-balance correction gain of each of the areas is peculiar or not, based on a comparison with estimated white-balance correction gains of surrounding areas adjoining the area of attention, which is the area for which the determination is being performed;

modify an estimated white-balance correction gain of an area determined to be peculiar, based on estimated white-balance correction gains of surrounding areas adjoining the area determined to be peculiar;

generate a white-balance correction gain map of an entirety of the inputted image in which the estimated white-balance correction gain of the area determined to be peculiar, among estimated white-balance correction gains of all the areas, is modified;

perform white-balance processing of an entirety of the inputted image based on the generated white-balance correction gain map to generate a white-balance-corrected image; and output the generated white-balance-corrected image.

2. The multi-area white-balance image-processing device according to claim 1, wherein the computer is further configured to:

perform a smoothing process for the estimated white-balance correction gains of all the areas in the entirety of the inputted image including the area which is determined to be peculiar and the estimated white-balance correction gain of which is modified; and generate the white-balance correction gain map of the entirety of the inputted image in which the white-balance correction gain of the area determined to be peculiar, among the estimated white-balance correction gains of all the areas, is modified, and, furthermore, in which the white-balance correction gains of all the areas are smoothing-processed.

3. The multi-area white-balance image-processing device according to claim 2, wherein, if the estimated white-balance correction gain of the area of attention is different from all of the estimated white-balance correction gains of the surrounding areas adjoining the area of attention by a predetermined amount or more, the computer determines that the estimated white-balance correction gain of the area of attention is peculiar.

4. The multi-area white-balance image-processing device according to claim 2, wherein, if the estimated white-balance correction gain of the area of attention is different from all of estimated white-balance correction gains of upper, lower, left and right areas adjoining the area of attention by a predetermined amount or more, the computer determines that the estimated white-balance correction gain of the area of attention is peculiar.

5. The multi-area white-balance image-processing device according to claim 2, wherein, if the estimated white-balance correction gain of the area of attention is different, by a predetermined amount or more, from all of estimated white-balance correction gains of areas within a predetermined radius range around the area of attention, including the surrounding areas adjoining the area of attention, the computer determines that the estimated white-balance correction gain of the area of attention is peculiar.

6. The multi-area white-balance image-processing device according to claim 2, wherein the computer modifies the estimated white-balance correction gain of the area determined to be peculiar, based on estimated white-balance correction gains of surrounding areas including upper, lower, left and right areas adjoining the area determined to be peculiar.

7. The multi-area white-balance image-processing device according to claim 2, wherein the computer modifies the estimated white-balance correction gain of the area determined to be peculiar, based on estimated white-balance correction gains of surrounding areas within a predetermined radius range around the area determined to be peculiar, including the surrounding areas adjoining the area determined to be peculiar.

8. The multi-area white-balance control image-processing device according to claim 7, wherein the computer modifies the estimated white-balance correction gain of the area determined to be peculiar, based on estimated white-balance correction gains of surrounding areas within the predetermined radius range around the area determined to be peculiar, including upper, lower, left and right areas adjoining the area determined to be peculiar.

9. The multi-area white-balance image-processing device according to claim 1, wherein, if the estimated white-balance correction gain of the area of attention is different from all of the estimated white-balance correction gains of the surrounding areas adjoining the area of attention by a predetermined amount or more, the computer determines that the estimated white-balance correction gain of the area of attention is peculiar.

10. The multi-area white-balance image-processing device according to claim 1, wherein, if the estimated white-balance correction gain of the area of attention is different from all of estimated white-balance correction gains of upper, lower, left and right areas adjoining the area of attention by a predetermined amount or more, the computer determines that the estimated white-balance correction gain of the area of attention is peculiar.

11. The multi-area white-balance image-processing device according to claim 1, wherein, if the estimated white-balance correction gain of the area of attention is different, by a predetermined amount or more, from all of estimated white-balance correction gains of areas within a predetermined radius range around the area of attention, including the surrounding areas adjoining the area of attention, the computer determines that the estimated white-balance correction gain of the area of attention is peculiar.

12. The multi-area white-balance image-processing device according to claim 1, wherein computer modifies the estimated white-balance correction gain of the area determined to be peculiar, based on estimated white-balance correction gains of surrounding areas including upper, lower, left and right areas adjoining the area determined to be peculiar.

13. The multi-area white-balance image-processing device according to claim 1, wherein the computer modifies the estimated white-balance correction gain of the area determined to be peculiar, based on estimated white-balance correction gains of surrounding areas within a predetermined radius range around the area determined to be peculiar, including the surrounding areas adjoining the area determined to be peculiar.

14. The multi-area white-balance image-processing device according to claim 13, wherein the computer modifies the estimated white-balance correction gain of the area determined to be peculiar, based on estimated white-balance correction gains of surrounding areas within the predetermined radius range around the area determined to be peculiar, including upper, lower, left and right areas adjoining the area determined to be peculiar.

15. An image-capture apparatus comprising the multi-area white-balance image-processing device according to claim 1.

16. A multi-area white-balance image-processing method for a multi-area white-balance image-processing device comprising a computer, the method comprising:

dividing an inputted image into a plurality of areas;

estimating a white-balance correction gain for each of the areas into which the inputted image is divided;

determining whether the estimated white-balance correction gain of each of the areas is peculiar or not, based on a comparison with estimated white-balance correction gains of surrounding areas adjoining the area of attention, which is the area for which the determining is being performed;

modifying an estimated white-balance correction gain of an area determined to be peculiar, based on estimated white-balance correction gains of surrounding areas adjoining the area determined to be peculiar;

generating a white-balance correction gain map of an entirety of the inputted image in which the estimated white-balance correction gain of the area determined to be peculiar, among estimated white-balance correction gains of all the areas, is modified;

performing white-balance processing of an entirety of the inputted image based on the generated white-balance correction gain map to generate a white-balance-corrected image; and outputting the generated white-balance-corrected image.

17. A multi-area white-balance image-processing device comprising:

area dividing means that divides an inputted image into a plurality of areas;

white-balance correction gain estimating means that estimates a white-balance correction gain for each of the areas into which the inputted image is divided by the area dividing means;

white-balance correction gain peculiarity determining means that determines whether the estimated white-balance correction gain of each of the areas is peculiar or not, based on a comparison with estimated white-balance correction gains of surrounding areas adjoining the area of attention, which is the area for which the determination is being performed;

white-balance correction gain modifying means that modifies an estimated white-balance correction gain of an area determined to be peculiar by the white-balance correction gain peculiarity determining means, based on estimated white-balance correction gains of surrounding areas adjoining the area determined to be peculiar;

white-balance correction gain map generation means that generates a white-balance correction gain map of an entirety of the inputted image in which the estimated white-balance correction gain of the area determined to be peculiar, among estimated white-balance correction gains of all the areas, is modified; and white-balance gain correction means that performs white-balance processing of an entirety of the inputted image based on the generated white-balance correction gain map to generate a white-balance-corrected image, and outputs the generated white-balance corrected image.

18. A non-transitory computer-readable medium having stored thereon a multi-area white-balance image-processing program that is executable by a computer provided in a multi-area white-balance image-processing device, the multi-area white-balance image-processing program being executable by the computer to cause the computer to perform functions comprising:

dividing an inputted image into a plurality of areas;

estimating a white-balance correction gain for each of the areas into which the inputted image is divided;

determining whether the estimated white-balance correction gain of the area is peculiar or not, based on a comparison with estimated white-balance correction gains of surrounding areas adjoining the area of attention, which is the area for which the determining is being performed;

modifying an estimated white-balance correction gain of an area determined to be peculiar, based on estimated white-balance correction gains of surrounding areas adjoining the area determined to be peculiar;

generating a white-balance correction gain map of an entirety of the inputted image in which the estimated white-balance correction gain of the area determined to be peculiar, among estimated white-balance correction gains of all the areas, is modified;

performing white-balance processing of an entirety of the inputted image based on the generated white-balance correction gain map to generate a white-balance-corrected image; and outputting the generated white-balance-corrected image.

19. An image-capture apparatus comprising the multi-area white-balance image-processing device according to claim 2.

* * * * *